T. Earle,
Egg-Beater,
Nº 54,134, Patented Apr. 24, 1866.
Fig: 2.
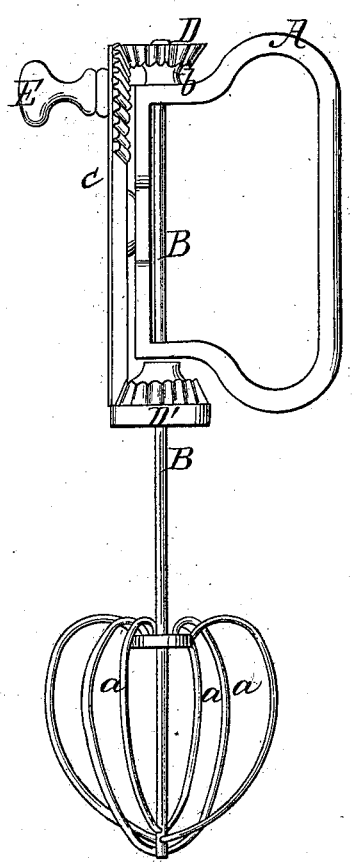
Fig. 1.
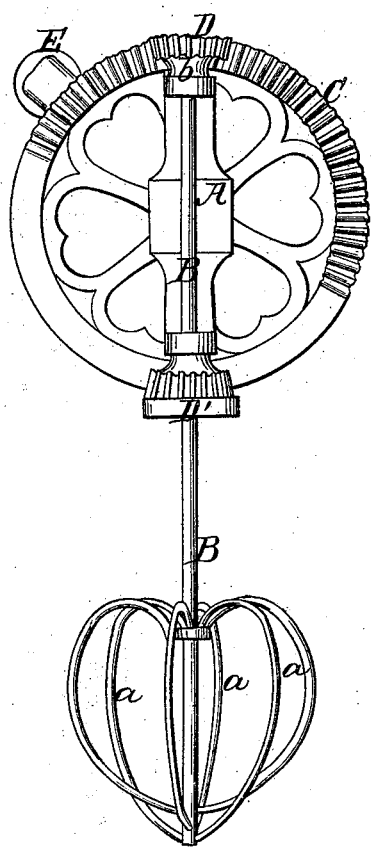
Witnesses;
John D. Thurston
William M. Connelly
Inventor;
Timothy Earle

UNITED STATES PATENT OFFICE.

TIMOTHY EARLE, OF VALLEY FALLS, (SMITHFIELD,) RHODE ISLAND.

IMPROVED EGG-BEATER.

Specification forming part of Letters Patent No. 54,134, dated April 24, 1866.

*To all whom it may concern:*

Be it known that I, TIMOTHY EARLE, of Valley Falls, (Smithfield,) in the county of Providence and State of Rhode Island, have invented a new and useful Improvement in Egg-Beaters; and I do hereby declare that the following specification, taken in connection with the drawings making a part of the same, is a full, clear, and exact description thereof.

Figures 1 and 2 are views in perspective of my improved egg-beater in two positions.

In the accompanying drawings, the frame A, Fig. 2, is both the handle, by which the apparatus is held by the left hand, and the support for the spindle B, to which the beaters $a\ a\ a$ are attached. The actuating toothed sector-wheel C (presently to be described) is also mounted upon an axle affixed to the same frame.

The spindle or shaft B, provided with the wire beaters $a\ a\ a$, arranged in any convenient form and of any preferred shape, and whether made of round wire or with cutting-edges, is arranged to turn in suitable journal-guides, made in the form as shown, a collar or nut, $b$, being placed above the upper journal, and resting on the frame to furnish a bearing to prevent the spindle from slipping downward. A similar collar may also be placed above the lower journal, if desired.

D and D' are beveled pinions keyed to the spindle B, the one above and the other below the frame A. C is a toothed sector-wheel, which has for its axle a stud-pin projecting from the frame A, and embraces as near as may be the arc of a semicircle of a radius sufficient to enable the teeth of the sector to engage first with one pinion and then with the other.

It is obvious that when the teeth of the sector are engaged with the teeth of the pinion D the spindle will be rotated in one direction; but so soon as the sector leaves such pinion and engages with the teeth of the pinion D', the spindle will be rotated in the opposite direction. Thus a rotatory motion alternating in opposite directions will be given to the beaters by rotating in one direction the sector, which is provided with a convenient handle, E, for the purpose.

What I claim as my invention, and desire to secure by Letters Patent, is—

The combination of the spindle B, with its beaters $a\ a\ a$, the pinions D D', and the toothed sector C, the same being arranged to operate together as described, for the purposes specified.

TIMOTHY EARLE.

Witnesses:
JOHN D. THURSTON,
WILLIAM M. CONNELLY.